June 1, 1943. G. G. EISENBEIS 2,320,579
FERRULE
Filed Sept. 21, 1942
Fig. 1.
Fig. 2.
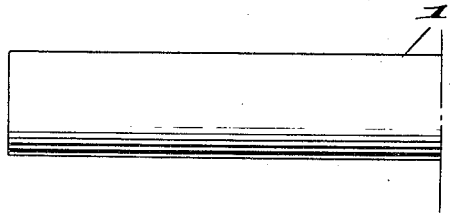
Fig. 3. Fig. 4.
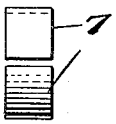 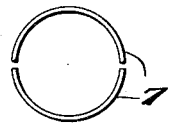
Fig. 5. Fig. 6.
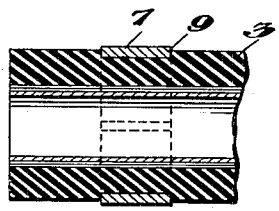 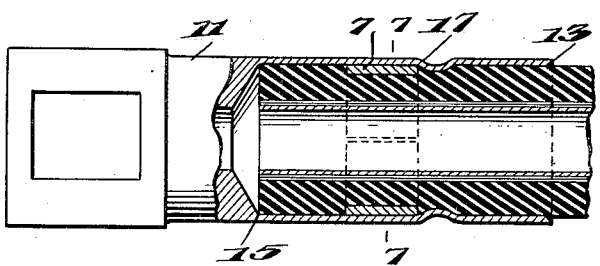
Fig. 7.
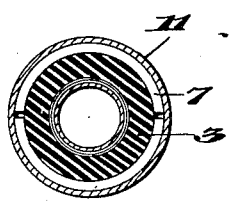
Inventor
GEORGE G. EISENBEIS,
By Leech & Radue
Attorneys Patented June 1, 1943

2,320,579

UNITED STATES PATENT OFFICE 2,320,579

FERRULE

George G. Eisenbeis, Binghamton, N. Y., assignor to Stow Manufacturing Company, Inc., Binghamton, N. Y., a corporation of New York Application September 21, 1942, Serial No. 459,143

6 Claims. (Cl. 285—84)

This invention relates to a ferrule or end connection for use on non-metallic hose or tubular casings. More particularly, the invention is applicable to the permanent attachment of a metallic end piece to a non-metallic hose such as a conventional fabric and rubber hose in such a manner that the ferrule or end piece will not work loose or become detached from the hose. While the invention may be used on all types of non-metallic tubes or pipes, it is particularly adaptable for use in applying metallic end members to flexible casings overlying flexible rotary shafts.

A number of attempts have been made to permanently secure metal end pieces to rubber hose but without much success. These prior constructions have included screws or other penetrating fasteners including sharpened tongues punched out of the end piece for gripping the hose. Split rings overlying the hose and embedded therein by rolling the skirt portion of the casing behind the ring have been proposed and, also, multipiece couplings in which one element is adapted to cam a slit ring or the like into the hose and bind the ring against another piece of the coupling. In all instances, these prior connections have either resulted in the weakening of the hose or, after some use, the end couplings loosen up and become detached. Furthermore, hose casings used for enveloping flexible shafting are subjected to extremely heavy tension loads applied at the end pieces, thus rendering conventional methods of attachment inadequate, this being especially true where the flexible shaft is used to drive a concrete vibrator.

These difficulties of the prior art are completely eliminated in the present invention and the end coupling here described forms a permanently attached end piece which will outlast the hose.

In the accompanying drawing:

Fig. 1 illustrates a conventional rubber or other non-metallic hose showing the uniform exterior surface thereof;

Fig. 2 illustrates the hose after it has been initially prepared and grooved to form an exterior peripheral locking channel therein;

Figs. 3 and 4 illustrate a two-piece metal ring for engagement with the locking channel formed in the periphery of the hose;

Fig. 5 illustrates the initial position of the split ring in the locking channel formed in the hose;

Fig. 6 is a view partly in cross-section showing the relationship of the several parts after the end ferrule has been permanently attached to the hose; and Fig. 7 is a vertical section taken on line 7—7 of Fig. 6, showing the locking ring and casing in secured position.

Specifically, in the drawing, the end portion of a conventional casing or hose 1 shown in Fig. 1 is ground or cut away for a distance the length of the cylindrical skirt portion of the ferrule to be attached thereto to uniformly reduce its diameter 3 to that of the inside diameter of the ferrule as the outside diameter of commercial hose is not always constant in size. An intermediate deepened channel or locking groove 5 of substantial width and depth is also formed in portion 3. The initially prepared casing is thereupon fitted in the grooved section 5 thereof with a two-piece metal ring 7, so that, in uncompressed condition, the outer face 9 of the ring sections are very slightly elevated above the ground portion 3 of the casing, this being shown in Figure 5. While in this position the ring 7 is compressed by means of a suitable tool to reduce its diameter and force it into contact with the bottom and sides of the channel and an end piece or ferrule 11 having an outer chamfered edge 13 is driven over the end of the casing. Due to the edge chamfer 13 thereon the end of the ferrule squeezes the parts of the ring toward each other and permits the ferrule to slide thereover until its inner shoulder 15 abuts the end of the hose 1. If desired the ground off part 3 of the hose may be coated with a suitable sealing cement.

Following the positioning of the ferrule onto the hose a continuous groove 13 is rolled into the skirt portion of the ferrule directly behind the ring 7. This groove preferably contacts the rear edge of the ring sections 7 and maintains the assembly in fixed position. The ring sections 7 have complete contact with the straight sides of the locking groove 5 throughout their length and thickness and the sections are rigidly fixed in this position by the compressing action of the ferrule and side of the groove 17 which bears on the outer rearward edges of the ring sections. It will be observed that the inside diameter of the semi-circular ring sections is slightly less than the diameter of the portion 5 of the hose, so that, when the unit is assembled, the ends of the ring sections do not quite come together.

What I claim is:

1. An end ferrule assembly comprising, in combination, a rubber hose and an end ferrule therefor, the said hose having its end portion reduced in diameter to snugly fit inside the end ferrule, an annular channel formed in said reduced diameter portion of the hose, a split ring positioned in said annular channel, and an indentation in said ferrule immediately adjacent the rear edge of said ring.

2. An end ferrule assembly as defined in claim 1 wherein the said split ring is composed of two semi-circular segments having a normal inside diameter slightly less than the diameter of the reduced end portion of the hose.

3. An end ferrule assembly as defined in claim 1 wherein said annular channel in said reduced diameter portion of the hose is located a substantial distance from the end of the hose and is of substantial width and provided with vertical side walls to maintain contact with the sides and inner circumference of the sections of the split ring.

4. An end ferrule assembly as defined in claim 1 wherein the said annular channel is of substantial width and has straight side walls with the sections of the split ring contacting the sides and bottom thereof, the said indentation in the ferrule consisting of a continuous circumferential groove in continuous contact with the outer rearward edges of the ring sections.

5. In a hose coupling assembly, in combination, a flexible non-metallic hose and a metallic coupling member therefor including an end sleeve fitted over the end of the hose, a metallic ring positioned in an annular channel prepared in the outer surface of the hose and underlying the said coupling member and a groove in said coupling member directly behind the rear edge of said metallic ring.

6. In a hose end ferrule assembly, in combination, a non-metallic hose having a reduced diameter end portion and an annular channel of substantial width formed in said reduced diameter portion, a cylindrical split ring in said channel, the outer surface of said ring normally protruding slightly beyond the surface of the reduced diameter hose end portion and a metallic cylindrical ferrule portion fitted over said ring and contacting the split ring and the reduced diameter end portion throughout the length thereof.

GEORGE G. EISENBEIS.